United States Patent
Melchiors et al.

(10) Patent No.: US 7,199,178 B2
(45) Date of Patent: Apr. 3, 2007

(54) LOW-SOLVENT, OH-FUNCTIONAL DISPERSIONS

(76) Inventors: Martin Melchiors, Am Sandberg 35, 42799 Leichlingen (DE); Thomas Münzmay, Robert-Koch-Str. 21, 41539 Dormagen (DE); Thomas Stingl, Im Wiesengrund 32, 56410 Montabaur (DE); Hartmut Ottensmann, Fährstr. 220, 40221 Düsseldorf (DE); Heinz-Dietmar Gewiss, Webergasse 30, 40668 Meerbusch (DE)

( * ) Notice: Subject to any disclaimer, the term of this patent is extended or adjusted under 35 U.S.C. 154(b) by 0 days.

(21) Appl. No.: 11/041,774

(22) Filed: Jan. 24, 2005

(65) Prior Publication Data

US 2005/0165145 A1    Jul. 28, 2005

(30) Foreign Application Priority Data

Jan. 27, 2004  (DE) .................. 10 2004 003 894

(51) Int. Cl.
C08L 31/00 (2006.01)
C08L 33/00 (2006.01)
C09D 5/02 (2006.01)
C08F 283/00 (2006.01)
C08F 2/00 (2006.01)
C08F 2/38 (2006.01)
C08J 32/08 (2006.01)

(52) U.S. Cl. .................. 524/556; 524/556; 524/457; 524/458; 524/460; 526/73; 526/80; 526/319; 526/346; 522/170; 522/104; 522/150; 522/168; 427/487; 427/508; 427/512; 427/202

(58) Field of Classification Search .......... 524/556, 524/457, 458, 460; 526/73, 80, 319; 522/170, 522/104; 427/487, 508
See application file for complete search history.

(56) References Cited

U.S. PATENT DOCUMENTS

| 4,423,165 | A | 12/1983 | Harper et al. ............. 523/409 |
| 4,539,362 | A | 9/1985 | Davies et al. ............. 524/458 |
| 5,252,696 | A | 10/1993 | Laas et al. ................ 528/49 |
| 5,472,999 | A | 12/1995 | Kudoh et al. ............. 523/409 |
| 6,139,918 | A | 10/2000 | Irle et al. ................ 427/385.5 |
| 6,251,985 | B1 | 6/2001 | Wamprecht et al. ........ 524/539 |
| 6,399,691 | B1 * | 6/2002 | Melchiors et al. .......... 524/457 |
| 6,426,414 | B1 | 7/2002 | Laas et al. ................ 544/222 |
| 6,429,256 | B1 | 8/2002 | Vandevoorde et al. ..... 524/591 |
| 6,756,420 | B2 * | 6/2004 | Ogawa et al. ............. 522/170 |
| 6,767,958 | B2 | 7/2004 | Laas et al. ................ 524/840 |
| 2004/0034162 | A1 | 2/2004 | Laas et al. ................ 524/589 |

FOREIGN PATENT DOCUMENTS

| DE | 32 09 421 | 9/1983 |
| DE | 100 07 821 | 8/2001 |
| EP | 133 949 | 7/1987 |
| EP | 288 763 | 5/1991 |

OTHER PUBLICATIONS

Coatings.de—RadTech Europe 2005, Website.*
Product Bulletin—Resolution Performance Products, Website.*
Paint & Resin, Dec. 1983, pp. 34, 35, 37, and 49, G.Y. Talak and S.P. Pontis, "Thermosetting Acrylic Emulsions".
Lackkunstharze, (month unavailable) 1971, pp. 153-194, Drittes Kapitel & Dr. Ernst Schneider, "Polyadditionsharze".

* cited by examiner

Primary Examiner—Duane Smith
Assistant Examiner—Ives Wu
(74) Attorney, Agent, or Firm—Joseph C. Gil; John E. Mrozinski, Jr.

(57) ABSTRACT

A process for preparing copolymer dispersions that includes subjecting A) one or more vinyl monomer mixtures containing a) OH-free (meth)acrylic esters and/or vinylaromatics, b) hydroxy-functional vinyl monomers and/or hydroxy-functional (meth)acrylic esters, c) ionic and/or potentially ionic monomers capable of free-radical copolymerization, and d) optionally further monomers, other than the compounds of components a)–c), capable of free-radical copolymerization; to free-radical polymerization in the presence of e) compounds according to formula (I)

formula (I)

$$R^1 {-\!\!\left[\!\!\begin{array}{c} O \\ \| \\ C \end{array}\!\!-\!\!O\!-\!CH_2\!-\!\underset{\underset{H}{|}}{\overset{}{C}}\!-\!CH_2\!-\!O\!-\!\begin{array}{c} O \\ \| \\ C \end{array}\!\!-\!\underset{R^3}{\overset{R^2}{C}}\!-\!R^4\right]\!\!}_n$$

where $R^1$ is an aliphatic, araliphatic or aromatic radical having 1 to 18 carbon atoms, $R^2$ is H or $CH_3$, $R^3$, $R^4$ are identical or different aliphatc radicals having 1 to 7 carbon atoms and n is 1 to 4; and subsequently dispersing the resultant copolymer B) before or after addition of a neutralizing agent C) in water. The resulting dispersions can be used to coat substrates.

21 Claims, No Drawings

LOW-SOLVENT, OH-FUNCTIONAL DISPERSIONS

CROSS REFERENCE TO RELATED PATENT APPLICATION

The present patent application claims the right of priority under 35 U.S.C. §119 (a)–(d) of German Patent Application No. 10 2004 003 894.5, filed Jan. 27, 2004.

BACKGROUND OF THE INVENTION

1. Field of the Invention

The invention relates to aqueous, hydroxy-functional binder dispersions with a low solvent content and based on hydroxy-functional copolymers, to a process for preparing such binders, to binder combinations based thereon and to the use of the binders in coating materials.

2. Description of the Prior Art

The use in coating systems (Paint & Resin 12/83, p. 34 ff., DE-A 3 209 421, EP-A 95 263, EP-A 105 293, EP-A 133 949, EP-A 288 763 and literature cited therein) of copolymer-based, water-dilutable binders is known. Generally, however, these systems include emulsifiers for stabilizing and/or relatively large fractions of organic cosolvents.

The emulsifiers normally affect the properties of the coating materials or of the coatings, such as water resistance, film appearance (gloss), pigmentability, for example, adversely.

The use of relatively large amounts of organic solvents is undesirable on environmental grounds. However, it cannot be avoided in order to ensure sufficient stirrability and heat removal from the reaction mixture in the course of polymer preparation and also to ensure a certain minimum filling level of the reactor; Organic solvents additionally lead in aqueous coating materials to advantageous effects such as enhanced storage stability, pigment wetting, film appearance and levelling.

Removing subsequently from copolymers or copolymer dispersions the solvents present therein for process-related reasons entails much energy consumption and great complexity of apparatus, and hence also high costs, so that there is a need for aqueous polymer dispersions in whose preparation the use of organic solvents can be largely avoided without impairment to the performance properties.

Copolymer dispersions which are to be cured by means of a chemical reaction, as for example with an amino resin, a blocked polyisocyanate or a polyisocyanate, must contain a certain amount of reactive groups, hydroxyl groups for example. These groups are generally incorporated into the copolymer through the use of hydroxy-functional (meth) acrylic esters during the copolymerization. In comparison to the non-functional (meth)acrylic esters or else to styrene, however, these raw materials are very expensive. Additionally it is often necessary to use relatively large amounts of these raw materials as compared with copolymers in organic solution, in order to compensate the hydrophilicity of the coating films by means of a relatively large crosslinking density.

One way to prepare hydroxy-functional secondary copolymer dispersions that largely avoids the use of solvents in the polymerization is shown by the teaching of EP-A 0 758 007. According to that publication the solvents normally used are replaced in whole or in part by hydroxy-functional polyethers. The hydroxy-functional polyethers remain as reactive diluents in the secondary dispersion and in the course of subsequent crosslinking they too react with isocyanates or blocked isocyanates to form urethane. Consequently they do not contribute to the VOC. A disadvantage experienced with these products, however, is their poor stability.

SUMMARY OF THE INVENTION

The present invention is directed to a process for preparing copolymer dispersions that includes subjecting A) one or more vinyl monomer mixtures containing a) OH-free (meth) acrylic esters and/or vinylaromatics, b) hydroxy-functional vinyl monomers and/or hydroxy-functional (meth)acrylic esters, c) ionic and/or potentially ionic monomers capable of free-radical copolymerization, and d)optionally further monomers, other than the compounds of components a)–c), capable of free-radical copolymerization; to free-radical polymerization in the presence of e) compounds according to formula (I)

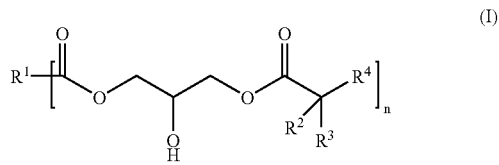

where $R^1$ is an aliphatic, araliphatic or aromatic radical having 1 to 18 carbon atoms, $R^2$ is H or $CH_3$, $R^3$, $R^4$ are identical or different aliphatc radicals having 1 to 7 carbon atoms and n is 1 to 4, and subsequently dispersing the resultant copolymer B) before or after addition of a neutralizing agent C) in water.

The present invention is also directed to copolymer dispersions obtained according to the above-described process as well as coatings obtained from such copolymer dispersions and substrates coated with such coatings.

The present invention is additionally directed to a method of preparing a coating composition that includes combining the above-described copolymer dispersions with at least one OH-reactive crosslinker as well as the resulting aqueous coating composition.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about".

It has now been found that aqueous copolymer dispersions with a low solvent content and a high stability level in the coating films, based on hydroxy-functional copolymers, can be prepared if hydroxy-functional components of the formula (I):

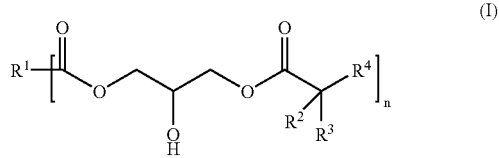

where $R^1$ is an aliphatic, araliphatic or aromatic radical having 1 to 18 carbon atoms, $R^2$ is H or $CH_3$, $R^3$, $R^4$ are identical or different aliphatc radicals having 1 to 7 carbon atoms and n is 1 to 4, are used as reactive diluents.

The invention accordingly provides a process for preparing copolymer dispersions by subjecting A) one or more vinyl monomer mixtures comprising
   a) OH-free (meth)acrylic esters and/or vinylaromatics,
   b) hydroxy-functional vinyl monomers or hydroxy-functional (meth)acrylic esters,
   c) ionic and/or potentially ionic monomers capable of free-radical copolymerization, and
   d) if desired further monomers, other than the compounds of components a)–c), capable of free-radical copolymerization to free-radical polymerization in the presence of
   e) compounds of the formula (I)

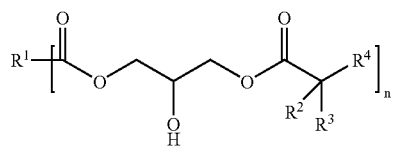

formula (I)

in which
$R^1$ is an aliphatic, araliphatic or aromatic radical having 1 to 18 carbon atoms,
$R^2$ is H or $CH_3$,
$R^3$, $R^4$ are identical or different aliphatc radicals having 1 to 7 carbon atoms and
n is 1 to 4,
and subsequently dispersing the resultant copolymer
B) before or after addition of a neutralizing agent
C) in water.

The invention further provides the aqueous copolymer dispersions obtainable by the process described above.

As monomers of component a) use is made of acrylates and methacrylates (referred to below as (meth)acrylates) having 1 to 18 carbon atoms in the alcohol moiety of the ester group. This alcohol moiety may be linear aliphatic, branched aliphatic or cycloaliphatic.

Examples of suitable monomers of component a) include methyl, ethyl, n-propyl, n-butyl, isopropyl, isobutyl, t-butyl, the isomeric pentyl, hexyl, 2-ethylhexyl, octyl, dodecyl, hexadecyl, octadecyl or cyclohexyl, trimethylcyclohexyl and isobornyl (meth)acrylates.

In a) it is additionally possible to use acetoacetoxyethyl methacrylate, acrylamide, acrylnitrile, vinyl ethers, methacrylonitrile, vinyl acetates, optionally substituted styrenes and vinyltoluenes.

Likewise possible is the use of any desired mixtures of the aforementioned compounds in component a).

In component b) it is possible to use ethylenically unsaturated monomers containing OH groups, such as hydroxyalkyl esters of unsaturated carboxylic acids, for example, preferably hydroxyalkyl (meth)acrylates having 2 to 12, preferably 2 to 6, carbon atoms in the hydroxyalkyl radical.

Examples of such compounds are 2-hydroxyethyl (meth)acrylate, the isomeric hydroxypropyl (meth)acrylates, 2-, 3- and 4-hydroxybutyl (meth)acrylates and the isomeric hydroxyhexyl (meth)acrylates.

In the context of the present invention (meth)acrylates are always understood to mean the relevant acrylates and methacrylates.

Likewise in b) it is possible to use polymerizable hydroxy-functional monomers chain-extended or modified with alkylene oxides and having a number-average molecular weight $\leq 3000$ g/mol, preferably $\leq 500$ g/mol. Alkylene oxides employed for this purpose include preferably ethylene, propylene or butylene oxide, individually or in mixtures.

As ionic and/or potentially ionic monomers of component c), capable of free-radical copolymerization, it is possible to use olefinically unsaturated monomers containing carboxylic acid or carboxylic anhydride groups, such as acrylic acid, methacrylic acid, β-carboxyethyl acrylate, crotonic acid, fumaric acid, maleic anhydride, itaconic acid or monoalkyl esters of dibasic acids or anhydrides such as monoalkyl maleates, for example, preference being given to acrylic acid and/or methacrylic acid.

Also suitable as compounds of component c), additionally, are unsaturated, free-radically polymerizable compounds containing phosphate or phosphonate or sulphonic acid or sulphonate groups, as described for example in WO-A 00/39181 (p. 8 line 13–p. 9 line 19), especially 2-acrylamido-2-methylpropanesulphonic acid.

Optionally it is also possible to use further monomers capable of free-radical copolymerization as compounds of component d). These may be, for example, (meth)acrylate monomers and/or vinyl monomers with a functionality of two or more, such as hexanediol di(meth)acrylate or divinylbenzene, for example. A further possibility is the addition of polymerizable compounds which have a non-ionically hydrophilicizing effect, such as acrylates of hydroxy-functional polyalkylene oxide ethers.

The proportions of the synthesis components a) to d) are typically chosen so as to give an OH number of from 12 to 200 mg KOH/g, preferably from 25 to 150 mg KOH/g and more preferably from 50 to 150 mg KOH/g solids and an acid number of from 0 to 50 mg KOH/g, preferably from 10 to 30, more preferably from 15 to 25 mg KOH/g solid.

Preferably, based on the copolymer, 50–85% by weight of component a), 15–40% by weight of component b), 0.5–5% by weight of component c) and 0–34.5% by weight of component d) are chosen so as to give copolymers which in terms of OH number and acid number conform to the above specifications.

Preference is given to using in e) compounds of the formula (I) where
$R^1$ contains 2 to 6 carbon atoms and
$R^3$, $R^4$ 1 to 7 carbon atoms
$R^2$ is H or $CH_3$ and
n is 1 to 4.

Particular preference is given to using in e) compounds of the formula (I) where
$R^1$ contains 2 or 4 carbon atoms and
$R^3$, $R^4$ 1 to 7 carbon atoms
$R^2$ is $CH_3$ and
n is 2.

Suitability as component e) is possessed, for example, by the reaction products of glycidyl esters of aliphatic carboxylic acids (e1)) with aliphatic, araliphatic or aromatic carboxylic acids (e2)).

Preferred compounds of component e1) for this case are glycidyl esters of Versatic acid, which are available for example as Cardura® E10P from Resolution BV., Netherlands.

Preferred compounds of component e2) for this case are saturated aliphatic monocarboxylic acids such as acetic, propionic, butyric, pentanoic, hexanoic, heptanoic, octanoic, 2-ethylhexanoic, nonanoic, decanoic, lauric, myristic, palmitic, margaric, stearic, arachidic, behenic, lignoceric acid or unsaturated monocarboxylic acids such as oleic, linoleic, linolenic, ricinoleic acid or aromatic monocarboxylic acids such as benzoic acid, aliphatic dicarboxylic or polycarboxylic acids such as succinic, glutaric, adipic, pimelic, suberic, azelaic, sebacic, nonanedicarboxylic, decanedicarboxylic, dimer fatty acids, which are obtainable by dimerizing unsaturated monocarbokylic acids; aromatic dicarboxylic or polycarboxylic acids such as terephthalic, isophthalic, o-phthalic, tetrahydrophthalic, hexahyrophthalic or trimellitic acid, for example. It is of course also possible to use mixtures of the stated compounds in component e2).

Particular preference is given to the use of glycidyl esters of Versatic acid as e1) in combination with aliphatic monocarboxylic acids such as 2-ethylhexanoic, decanoic, lauric, myristic, palmitic, stearic, arachidic and behenic acid and unsaturated monocarboxylic acids such as oleic, linoleic, linolenic, ricinoleic acid and also dicarboxylic acids such as succinic and adipic acid or the isomeric pythalic acids as e2). With particular preference adipic acid is used in e2).

The compounds of component e) can be prepared from components e1) and e2) prior to or simultaneously with the free-radical polymerization of the unsaturated monomers a) to d).

The temperature is typically from 50 to 200° C., preferably 90 to 140° C. Preferably the compounds of component e) are prepared from e1) and e2) prior to the free-radical polymerization of the unsaturated components a) to d).

The amount of component e) in relation to the sum of the amounts of a) to e) is typically 5 to 60% by weight, preferably 10 to 30% by weight and more preferably 15 to 30% by weight.

The procedure for polymerizing unsaturated monomers is familiar to the person skilled in the art. Typically for that purpose the reactive diluent e) or the synthesis components of reactive diluent e1) and e2) are charged to a reaction vessel and the unsaturated monomers are polymerized using a free-radical initiator.

If desired it is possible to employ additional organic solvents in minor amounts. Suitable auxiliary solvents are any solvents known in paint technology, such as alcohols, ethers, alcohols containing ether groups, esters, ketones, N-methyl-pyrrolidone or non-polar hydrocarbons and/or mixtures of these solvents. The solvents are used in amounts such that their concentration in the finished dispersion is from 0 to 5% by weight. If necessary the solvents used can be removed again partly by means of distillation. In one preferred embodiment, however, the use of additional organic solvents is omitted entirely.

The copolymerization is conducted generally at from 40 to 200° C., preferably from 60 to 180° C., more preferably from 80 to 160° C.

Suitable initiators for the polymerization reaction include organic peroxides such as di-tert-butyl peroxide or tert-butyl peroxy-2-ethylhexanoate and azo compounds such as azodiisobutyronitrile (AIBN). The amounts of initiator used depend on the desired molecular weight. For reasons of operational reliability and greater ease of handling it is also possible to employ peroxide initiators in the form of a solution in suitable organic solvents of the type mentioned above.

In one preferred embodiment of the process there is a two-stage addition and polymerization of unsaturated monomers of the aforementioned kind in the presence of component e). In that case in a first step (I) a hydroxy-functional copolymer having an OH number of from 12 to 200 mg KOH/g solids and an acid number of from 0 to 50 mg KOH/g solids, consisting of 55–90% by weight of component a), 2.5–50% by weight of component b), 0–6.5% by weight of component c) and 0–42.5% by weight of component d), is prepared. In a subsequent step (II) the reaction mixture obtained from step (I) is used to prepare a further polymer from monomers of components a)–d), this polymer having an OH number of from 20 to 200 mg KOH/g solids and an acid number of from 50 to 200 mg KOH/g solids. The polymer from step (II) is composed of 45–80% by weight of component a), 5–50% by weight of component b), 6.5–25% by weight of component c) and 0–43.5% by weight of component d). The percentages for the polymer composition add up to 100% by weight per polymer. The monomer amounts of the two polymer preparations are to be chosen such that the mass ratio of the polymer from step (I) to that from step (II) is from 10:1 to 1:2, preferably from 6:1 to 2:1.

Instead of a multistage polymerization process it is likewise possible to conduct the operation continuously (gradient polymerization); in other words a monomer mixture with a composition which changes in accordance with the composition of the copolymer or copolymers A) is added, in which case the hydrophilic monomer fractions in accordance with components c) and optionally d) are preferably higher towards the end of the feed than at the beginning.

The copolymers obtainable by the process of the invention have number-average molecular weights $M_n$ of from 500 to 30 000 g/mol, preferably from 1000 to 15 000 g/mol, more preferably from 1500 to 10 000 g/mol.

Before, during or after the dispersing of the hydroxy-functional copolymers A) in water (step C)) the acid groups present are at least proportionally converted into their salt form by adding suitable neutralizing agents (step B)). Suitable neutralizing agents include organic amines or water-soluble inorganic bases, such as soluble metal hydroxides, metal carbonates or metal hydrogen carbonates, for example.

Examples of suitable amines are N-methylmorpholine, triethylamine, ethyldiisopropylamine, N,N-dimethylethanolamine, N,N-dimethylisopropanol-amine, N-methyldiethanolamine, diethylethanolamine, triethanolamine, butanolamine, morpholine, 2-aminomethyl-2-methylpropanol or isophorone-diamine. In mixtures it is also possible proportionally to use ammonia. Particular preference is given to triethanolamine, N,N-dimethylethanolamine and ethyl diisopropyl amine.

The neutralizing agents are added in B) in amounts such that in total a theoretical degree of neutralization [of the acid groups] of from 40 to 150% is present, preferably from 60 to 120%. The degree of neutralization therefore works out to be the ratio of added basic groups of the neutralizing component from B) to acid functions of the copolymer. The pH of the aqueous binder dispersion of the invention is from 6 to 10, preferably from 6.5 to 9.

The aqueous, hydroxy-functional binder dispersions of the invention have a solids content of from 25 to 70% by weight, preferably from 35 to 60% by weight, more preferably from 50 to 59% by weight, and an organic solvent content of from 0 to 12% by weight, preferably from 1 to 3.5% by weight.

The binder dispersions of the invention can be processed to aqueous coating materials. By combination with crosslinkers it is possible in that case, depending on the reactivity or, where appropriate, blocking of the crosslinkers, to prepare not only one-component coating materials but also two-component coating materials. One-component coating materials for the purposes of the present invention are coating compositions wherein binder component and crosslinker component can be stored together without any crosslinking reaction taking place to a marked extent or to an extent detrimental to subsequent application. The crosslinking reaction does not take place until the time of application, after the crosslinker has been activated. This activation can be brought about, for example, through an increase in temperature. Two-component coating materals for the purposes of the present invention are coating compositions wherein binder component and crosslinker component have to be stored in separate vessels on account of their high reactivity. The two components are not mixed until shortly before application, when they react generally without additional activation: In order to accelerate the crosslinking reaction, however, it is also possible to use catalysts or to employ relatively high temperatures.

The present invention hence also provides aqueous coating compositions at least comprising
  i) one or more copolymer dispersions according to the invention and
  ii) at least one OH-reactive crosslinker.

Examples of suitable OH-reactive crosslinkers are polyisocyanate crosslinkers, amide and amine formaldehyde resins, phenolic resins, aldehyde resins and ketone resins, such as phenol-formaldehyde resins, resoles, furan resins, urea resins, carbamic ester resins, triazine resins, melamine resins, benzoguanamine resins, cyanamide resins and analine resins, as described in "Lackkunstharze", H. Wagner, H. F. Sarx, Carl Hanser Verlag Munich, 1971.

Preferred crosslinkers used are blocked or non-blocked polyisocyanates. Such polyisocyanates typically have two or more NCO groups per molecule and are based for example on isophorone diisocyanate, hexamethylene diisocyanate, 1,4-diisocyanatocyclohexane, bis(4-isocyanatocyclohexane)methane, 1,3-diisocyanatobenzene, triisocyanatononane or the isomeric 2,4- and 2,6-TDI and may further contain urethane, isocyanurate and/or biuret groups.

Particular preference is given to using low-viscosity, optionally hydrophilicized polyisocyanates of the aforementioned kind based on aliphatic or cycloaliphatic isocyanates.

The polyisocyanates used as crosslinkers generally have a viscosity at 23° C. of from 10 to 5000 mPas and if desired for viscosity adjustment may also be employed as a blend with small amounts of inert solvents.

The copolymers essential to the invention are generally sufficiently hydrophilic to allow even hydrophobic crosslinker resins to be dispersed without additional emulsifiers. The use of external emulsifiers, however, is not ruled out as a result of this.

Water-soluble or dispersible polyisocyanates are obtainable, for example, by modification with carboxylate, sulphonate and/or polyethylene oxide groups and/or polyethylene oxide/polypropylene oxide groups. Hydrophilicization of the polyisocyanates is possible, for example, by reaction with substoichiometric amounts of monohydric, hydrophilic polyether alcohols. The preparation of hydrophilicized polyisocyanates of this kind is described for example in EP-A 0 540 985 (p. 3, line 55 to p. 4 line 5).

Also highly suitable are the polyisocyanates containing allophanate groups that are described in EP-A 959 087 (p. 3 lines 39 to 51), which are prepared by reacting low-monomer-content polyisocyanates with polyethylene oxide polyether alcohols under allophanatization conditions. Also suitable are the water-dispersible polyisocyanate mixtures based on triisocyanatononane and described in DE-A 100 078 21 (p. 2 line 66 to p. 3 line 5), and also polyisocyanates hydrophilicized with ionic groups (sulphonate groups, phosphonate groups), as described for example in DE 100 24 624 (p. 3 lines 13 to 33).

In principle it is of course also possible to use mixtures of different crosslinker resins.

Before, during or after the preparation of the aqueous, hydroxy-functional binder dispersion of the invention it is possible to add the customary auxiliaries and additives of paint technology, such as defoamers, thickeners, pigments, dispersing assistants, catalysts, anti-skinning agents, anti-settling agents or emulsifiers, for example.

These auxiliaries and additives may also be added to the coating composition comprising the aqueous, hydroxy-functional binder dispersions of the invention.

The aqueous coating compositions comprising the aqueous, hydroxy-functional copolymer dispersions of the invention are suitable for all fields of use in which aqueous paint and coating systems with exacting requirements imposed on film stability are employed; for example, for the coating of mineral surfaces of building materials, and the coating and sealing of wood and wood-derived materials, coating of metallic surfaces (metal coating), coating and painting of asphaltic or bituminous coverings, painting and sealing of various plastics surfaces (plastics coating) and also high-gloss coating materials.

Since coating compositions comprising the copolymer dispersions essential to the invention lead to coatings having a very high level of properties, they are also suitable for producing crack-bridging coatings, preferably in the building sector and on mineral substrates.

The aqueous coating compositions comprising the aqueous, hydroxy-functional binder dispersions of the invention are employed for producing primers, surfacers, pigmented or transparent topcoat materials, clearcoat materials and high-gloss coating materials, and also one-coat materials, that may be employed in individual application and mass application, in the field of industrial coating, automotive OEM finishing and automotive refinish, for example.

It is preferable the aqueous coating compositions comprising the aqueous hydroxy-functional binder dispersions of the invention for coating or painting mineral surfaces, wood and plastics.

The coating compositions of the invention are cured typically at temperatures of from 0 to 140° C., preferably from 18 to 80° C.

These coatings combine a very good film appearance with a high level of solvent and chemicals resistance, good weathering stability, high hardness and rapid drying.

The coatings can be produced by a variety of spraying techniques such as, for example, air-pressure spraying, airless spraying or electrostatic spraying techniques using one-component or, where appropriate, two-component spraying units. The coating materials and coating compositions comprising the aqueous, hydroxy-functional binder dispersions of the invention can also be applied by other methods, however—for example, by brushing, rolling or knifecoating.

EXAMPLES

Unless indicated otherwise, all percentages are by weight.

Viscosity measurements were carried out using a cone and plate viscometer Physica Viscolab® LC3 ISO from Physica, Stuttgart, Germany in accordance with DIN 53019 at a shear rate of 40 $s^{-1}$.

The average particle size was determined by means of laser correlation spectroscopy (Zetasizer® 1000, Malvern Instruments, Herrenberg, Germany).

The OH numbers reported were calculated starting from the monomers employed.

Acid numbers: Determination method, DIN ISO 3682

Cardura® E10P: Glycidyl ester of Versatic acid, Resolution BV., NL

Dowanol® PnB: Propylene glycol n-butyl ether, Dow Chemicals, Midland, USA.

Peroxan® DB: Di-tert-butyl peroxide, Pergan GmbH, Bocholt, Germany.

Example 1

Reactive Diluent

A 5 l reaction vessel with stirring, cooling and heating apparatus was charged to 20° C. with 3172 g of Cardura® E10P and 927 g of adipic acid. This initial charge was heated to 140° C. with stirring. From about 140° C. an exothermic reaction occurred. Stirring was continued at 140° C. for 4 hours more. This gave a pale yellow resin having a viscosity of 2900 mPas at 23° C.

Example 2

Reactive Diluent

A 5 l reaction vessel with stirring, cooling and heating apparatus was charged to 20° C. with 3172 g of Cardura® E10P and 1054 g of isophthalic acid. This initial charge was heated to 160° C. with stirring. From about 150° C. an exothermic reaction occurred. Stirring was continued at 160° C. for 6 hours more. This gave a pale yellow resin having a viscosity of 150 000 mPas at 23° C.

Example 3

A 6 l reaction vessel with stirring, cooling and heating apparatus was charged with 600 g of reactive diluent according to Example 1 and this initial charge was heated to 148° C. At that temperature a solution of 8.25 g of di-tert-butyl peroxide in 8.25 g of Dowanol® PnB was added dropwise over the course of 20 minutes. Thereafter a monomer mixture of 365 g of methyl methacrylate, 854 g of hydroxyethyl methacrylate, 600 g of butyl acrylate and 480 g of styrene and, in parallel, a solution of 28.5 g of di-tert-butyl peroxide in 28.5 g of Dowanol® PnB were metered in at a uniform rate over the course of 4.5 hours. This temperature was maintained for 20 minutes. Thereafter a monomer mixture of 122.25 g of methyl methacrylate, 172.75 g of hydroxyethyl methacrylate, 96 g of butyl acrylate and 84 g of acrylic acid and, in parallel, a solution of 8.25 g of di-tert-butyl peroxide in 20.75 g of Dowanol® PnB were metered in at a uniform rate over the course of 1.5 hours. This was followed by stirring at 148° C. for an hour, then by cooling to 100° C. and by the addition of 174 g of triethanolamine. After 30 minutes of homogenization, dispersion was carried out with 2050 g of water over the course of 2 hours at 80° C. This gave a copolymer dispersion having the following data:

| | |
|---|---|
| OH content (solids; calculated theoretically) | 5.9% |
| Acid number (solids) | 23 mg KOH/g |
| Solids content | 50% |
| Viscosity | 2600 mPas/23° C. |
| pH (10% strength in water) | 7.5 |
| Degree of neutralization | 100% |
| Average particle size | 115 nm |

Example 4

A 6 l reaction vessel with stirring, cooling and heating apparatus was charged with 600 g of reactive diluent according to Example 2 and this initial charge was heated to 148° C. At that temperature a solution of 8.25 g of di-tert-butyl peroxide in 8.25 g of Dowanol® PnB was added dropwise over the course of 20 minutes. Thereafter a monomer mixture of 365 g of methyl methacrylate, 854 g of hydroxyethyl methacrylate, 600 g of butyl acrylate and 480 g of styrene and, in parallel, a solution of 28.5 g of di-tert-butyl peroxide in 28.5 g of Dowanol® PnB were metered in at a uniform rate over the course of 4.5 hours. This temperature was maintained for 20 minutes. Thereafter a monomer mixture of 122.25 g of methyl methacrylate, 172.75 g of hydroxyethyl methacrylate, 96 g of butyl acrylate and 84 g of acrylic acid and, in parallel, a solution of 8.25 g of di-tert-butyl peroxide in 20.75 g of Dowanol® PnB were metered in at a uniform rate over the course of 1.5 hours. This was followed by stirring at 148° C. for an hour, then by cooling to 100° C. and by the addition of 174 g of triethanolamine. After 30 minutes of homogenization, dispersion was carried out with 2050 g of water over the course of 2 hours at 80° C. This gave a copolymer dispersion having the following data:

| | |
|---|---|
| OH content (solids; calculated theoretically) | 3.3% |
| Acid number (solids) | 23 mg KOH/g |
| Solids content | 50% |
| Viscosity | 1700 mPas/23° C. |
| pH (10% strength in water) | 7.5 |
| Degree of neutralization | 100% |
| Average particle size | 115 nm |

Example 5

Comparative (EP-A 0 758 007, example 1)

A 6 l reaction vessel with stirring, cooling and heating apparatus was charged with 116 g of butyl glycol and 150 g of Desmophen® V218 (polyether based on propylene oxide and glycerine, OH number 245 mg KOH/g; Bayer AG, Leverkusen, DE) and this initial charge was heated to 155° C. At that temperature 321 g of butyl acrylate, 366 g of styrene and 198 g of hydroxyethyl methacrylate and, in parallel, a solution of 17.1 g of di-tert-butyl peroxide in 28.6 g of butyl glycol were metered in over the course of 2 hours. Thereafter a monomer mixture of 83 g of hydroxyethyl methacrylate, 180 g of butyl acrylate, 139 g of styrene and 34 g of acrylic acid and, in parallel, 12.9 g of di-tert-butyl peroxide in 21.4 g of butyl glycol were metered in over the course of 1 hour. This was followed by stirring at 150 to 155° C. for 2 hours, then by cooling to 100° C. and by the addition of 50 g of dimethylethanolamine. After 30 minutes of homogenization, dispersion was carried out with 1980 g of water over the course of 2 hours at 80° C. This gave a copolymer dispersion having the following data:

| | |
|---|---|
| OH content (solids; calculated theoretically) | 3.2% |
| Acid number (solids) | 18 mg KOH/g |
| Solids content | 40% |
| Viscosity | 830 mPas/23° C. |
| pH (10% strength in water) | 9.4 |
| Degree of neutralization | 100% |
| Average particle size | 51 nm |
| Solvent content | 4.5% |

Example 6

Resistance Properties

To determine the resistance properties coating compositions as per the table below (amounts in parts by weight) were prepared from the dispersions of examples 3 and 5 and Bayhydur® XP 2451 (hydrophilicized polyisocyanate based on HDI, Bayer AG, Leverkusen, DE) as crosslinkers and were applied with a manual doctor blade to a wooden panel (beech) and cured at room temperature for 24 h.

| Component | Film A | Film B |
|---|---|---|
| Dispersion from example 3 | 100 | |
| Dispersion from example 5 | | 100 |
| Bayhydur® XP 2451 | 20.6 | 20.8 |

Chemical resistance on the lines of DIN 68861, 210 μm wet film

| Medium and duration | | Film A | Film B |
|---|---|---|---|
| Water | 1 day | 5/2 | 5/2 |
| | 7 days | 5/2 | 4/2 |
| Shoe polish | 5 hours | 5/2 | 4/2 |
| Red wine | 5 hours | 4/2 | 4/2 |
| 98% ethanol | 1 hour | 4/0 | 3/0 |
| 12.5% ammonia | 1 hour | 5/2 | 4/2 |
| Isopropanol | 1 hour | 4/2 | 3/0 |
| | 5 hours | 4/1 | dissolved |

First Value: Marking
  5=no visible change; 0=test area severely altered or destroyed
Second Value: Residual Hardness
  2=unchanged; 0=readily removable mechanically
  The binder of the invention exhibits a markedly improved resistance to aggressive media, in particular to ethanol and isopropanol.

Example 7

Gloss

To assess the gloss properties coating compositions as per the table below (amounts in parts by weight) were prepared from the dispersions of examples 3 and 5 and Bayhydur® XP 2451 (hydrophilicized polyisocyanate based on HDI, Bayer AG, Leverkusen, DE) as crosslinkers, were applied with a manual doctor blade to a Leneta chart (polymer film according to DIN 53775, matt black, 430×165 mm, B. Schwegmann GmbH, Gelsdorf, DE) and were cured at room temperature for 24 hours.

| Component | Film C | Film D |
|---|---|---|
| Dispersion from example 3 | 100 | |
| Dispersion from example 4 | | 100 |
| Bayhydur® XP 2451 | 20.6 | 20.8 |

Gloss in percent measured to DIN 67 530 or ISO 2813 on clearcoat; 200 μm wet film

| Angle | Film C | Film D |
|---|---|---|
| 20° | 77% | 21% |
| 60° | 90% | 55% |
| 85° | 98% | 78% |

The binder of the invention gave coating films having substantially higher gloss than the comparable prior art binder.

Example 8

Film Hardness

To assess the film hardness, coating compositions as per the table below (amounts in parts by weight) were prepared from the dispersions of examples 3 and 5 and Bayhydur® XP 2451 (hydrophilicized polyisocyanate based on HDI, Bayer AG, Leverkusen, DE) as crosslinkers, were applied with a manual doctor blade to a glass plate with a wet film thickness 150 μm and were cured at room temperature for 24 hours.

The film hardness was determined as pendulum hardness in accordance with DIN EN ISO 1522 (pendulum damping)

| Component | Film A | Film B |
|---|---|---|
| Dispersion from example 3 | 100 | 100 |
| Dispersion from example 5 | 20.6 | 20.8 |
| Bayhydur® XP 2451 | | |
| Pendulum hardness after 3 days [s] | 94 | 78 |
| Pendulum hardness after 7 days [s] | 113 | 91 |

The comparison shows that the binders of the invention are superior to the prior art binders both in the rate at which hardness develops and in the ultimate hardness.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A process for preparing copolymer dispersions comprising subjecting
   A) one or more vinyl monomer mixtures comprising
      a) OH-free (meth)acrylic esters and/or vinylaromatics, b) hydroxy-functional vinyl monomers and/or hydroxy-functional (meth)acrylic esters,
c) ionic and/or potentially ionic monomers capable of free-radical copolymerization, and
d) optionally further monomers, other than the compounds of components a)–c), capable of free-radical copolymerization to free-radical polymerization in the presence of
e) compounds according to formula (I)

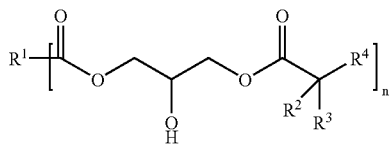

formula (I)

wherein
$R^1$ is an aliphatic, araliphatic or aromatic radical having 1 to 18 carbon atoms,
$R^2$ is H or $CH_3$,
$R^3$, $R^4$ are identical or different aliphatic radicals having 1 to 7 carbon atoms and
n is 1 to 4,
and subsequently dispersing the resultant copolymer before or after addition of
B) a neutralizing agent in
C) water.

2. The process for preparing copolymer dispersions according to claim 1, wherein the copolymers prepared in A) have an OH number of from 50 to 150 mg KOH/g solids, an acid number of from 15 to 25 mg KOH/g solids and a number-average molecular weight $M_n$ of from 1500 to 10,000 g/mol.

3. The process for preparing copolymer dispersions according to claim 1, wherein the copolymers prepared in A) are composed of 50–85% by weight of component a), 15–40% by weight of component b), 0.5–5% by weight of component c) and 0–34.5% by weight of component d) and the amounts from the above ranges add up to 100% by weight.

4. The process for preparing copolymer dispersions according to claim 1, wherein component e) comprises the reaction products of glycidyl esters of aliphatic carboxylic acids with aliphatic, araliphatic or aromatic carboxylic acids.

5. The process for preparing copolymer dispersions according to claim 1, wherein the polymerization is carried out in two stages.

6. Copolymer dispersions obtained according to the process of claim 1.

7. A method of preparing a coating composition comprising combining the copolymer dispersions according to claim 6 with at least one OH-reactive crosslinker.

8. Aqueous coating compositions comprising
i) one or more copolymer dispersions according to claim 6 and
ii) at least one OH-reactive crosslinker.

9. Coatings obtained from copolymer dispersions according to claim 6.

10. Substrates coated with coatings according to claim 9.

11. The process for preparing copolymer dispersions according to claim 2, wherein the copolymers prepared in A) are composed of 50–85% by weight of component a), 15–40% by weight of component b), 0.5–5% by weight of component c) and 0–34.5% by weight of component d) and the amounts from the above ranges add up to 100% by weight.

12. The process for preparing copolymer dispersions according to claim 2, wherein component e) includes the reaction products of glycidyl esters of aliphatic carboxylic acids with aliphatic, araliphatic or aromatic carboxylic acids.

13. Copolymer dispersions obtained according to the process of claim 2.

14. The process for preparing copolymer dispersions according to claim 3, wherein component e) includes the reaction products of glycidyl esters of aliphatic carboxylic acids with aliphatic, araliphatic or aromatic carboxylic acids.

15. Copolymer dispersions obtained according to the process of claim 3.

16. Aqueous coating compositions comprising
i) one or more copolymer dipersions according to claim 13 and
ii) at least one OH-reactive crosslinker.

17. Aqueous coating compositions comprising
i) one or more copolymer dispersions according to claim 15 and
ii) at least one OH-reactive crosslinker.

18. Coatings obtained from copolymer dispersions according to claim 13.

19. Substrates coated with coatings according to claim 18.

20. Coatings obtained from copolymer dispersions according to claim 15.

21. Substrates coated with coatings according to claim 20.

* * * * *